United States Patent
Klinger et al.

(10) Patent No.: US 10,373,071 B2
(45) Date of Patent: Aug. 6, 2019

(54) AUTOMATED INTELLIGENT DATA NAVIGATION AND PREDICTION TOOL

(71) Applicant: International Business Machines Corporation, Armonk, NY (US)

(72) Inventors: Tamir Klinger, Brooklyn, NY (US); Chandrasekhara K. Reddy, Kinnelon, NJ (US); Ashish Sabharwal, White Plains, NY (US); Horst C. Samulowitz, Port Chester, NY (US); Gerald J. Tesauro, Croton-On-Hudson, NY (US); Deepak S. Turaga, Elmsford, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 913 days.

(21) Appl. No.: 14/951,040

(22) Filed: Nov. 24, 2015

(65) Prior Publication Data

US 2017/0068905 A1    Mar. 9, 2017

Related U.S. Application Data

(63) Continuation of application No. 14/812,344, filed on Jul. 29, 2015.

(51) Int. Cl.
*G06N 5/04*    (2006.01)
*G06N 20/00*    (2019.01)

(52) U.S. Cl.
CPC ............... *G06N 20/00* (2019.01); *G06N 5/04* (2013.01)

(58) Field of Classification Search
None
See application file for complete search history.

(56) References Cited

U.S. PATENT DOCUMENTS

| 2012/0121142 | A1* | 5/2012 | Nagesh | G06K 9/00288 382/118 |
| 2013/0282626 | A1* | 10/2013 | White | G06Q 30/0201 706/11 |
| 2016/0321563 | A1* | 11/2016 | Sinha | G06N 99/005 |

OTHER PUBLICATIONS

List of IBM Patents or Patent Applications Treated as Related; Date Filed: Nov. 24, 2015; 2 Pages.

* cited by examiner

*Primary Examiner* — Robert A Cassity
*Assistant Examiner* — Michael Zidanic
(74) *Attorney, Agent, or Firm* — Cantor Colburn LLP; Rahan Uddin

(57) ABSTRACT

A system, method, and computer program product for automatically selecting from a plurality of analytic algorithms a best performing analytic algorithm to apply to a dataset is provided. The automatically selecting from the plurality of analytic algorithms the best performing analytic algorithm to apply to the dataset enables a training a plurality of analytic algorithms on a plurality of subsets of the dataset. Then, a corresponding prediction accuracy trend is estimated across the subsets for each of the plurality of analytic algorithms to produce a plurality of accuracy trends. Next, the best performing analytic algorithm is selected and outputted from the plurality of analytic algorithms based on the corresponding prediction accuracy trend with a highest value from the plurality of accuracy trends.

5 Claims, 10 Drawing Sheets

AUTOMATED INTELLIGENT DATA NAVIGATION AND PREDICTION TOOL

DOMESTIC PRIORITY

This application is a continuation of U.S. application Ser. No. 14/812,344, filed on Jul. 29, 2015, the disclosure of which is incorporated by reference herein in its entirety.

STATEMENT REGARDING FEDERALLY SPONSORED RESEARCH OR DEVELOPMENT

This invention was made with Government support under Contract number H98230-14-D-0038 awarded by National Security Agency. The Government has certain rights in this invention.

BACKGROUND

The present disclosure relates generally to automated data analysis, and more specifically, to an automated intelligent data navigation and prediction tool for automated training of models.

A task of a data scientist may be to select a "best" or most suitable model (i.e. learning or other analytic algorithm) to apply to a given data set. However, determining a best model for a given data set may be daunting, since the number of analytic algorithms available to data scientists is quite large (e.g., when counting available analytic algorithms across platforms there are easily hundreds). Further, the amount of data in typical modern data sets is also quite large. Given the large number of available analytic algorithms and the size of a given data set, it may be infeasible to apply all models to the full data set in a reasonable amount of time and expense. Data scientists must instead focus their effort on only the most promising models.

For example, training a single algorithm on a data set with one million samples is a time consuming process that can take days. In turn, when testing multiple analytic algorithms on this same one million data point data set, selecting a "best" or most suitable model can simply not be performed within a short time.

SUMMARY

Embodiments include a method, system, and computer program product for automatically selecting from a plurality of analytic algorithms a best performing analytic algorithm to apply to a dataset. The automated data analysis comprises training a plurality of analytic algorithms on a plurality of subsets of the dataset; estimating a corresponding prediction accuracy trend across the subsets for each of the plurality of analytic algorithms to produce a plurality of accuracy trends; selecting the best performing analytic algorithm from the plurality of analytic algorithms based on the corresponding prediction accuracy trend with a highest value from the plurality of accuracy trends; and outputting the best performing analytic algorithm.

Additional features and advantages are realized through the techniques of the present disclosure. Other embodiments and aspects of the disclosure are described in detail herein. For a better understanding of the disclosure with the advantages and the features, refer to the description and to the drawings.

BRIEF DESCRIPTION OF THE DRAWINGS

The subject matter that is regarded as the invention is particularly pointed out and distinctly claimed in the claims at the conclusion of the specification. The forgoing and other features, and advantages of the invention are apparent from the following detailed description taken in conjunction with the accompanying drawings in which:

DETAILED DESCRIPTION

Figure 1:
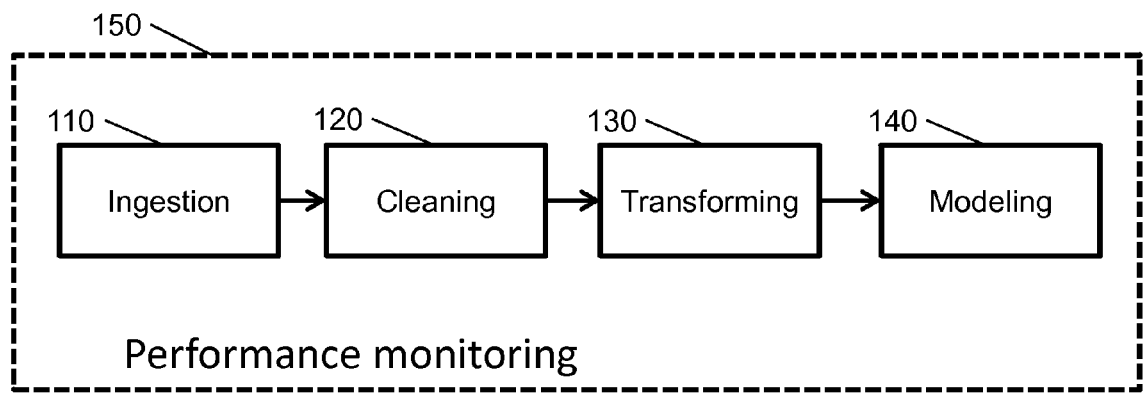
FIG. 1 depicts a data processing task flow according to an embodiment of the present invention.

Embodiments described herein relate to automated data analysis, and more specifically, to an automated intelligent data navigation and prediction tool for automated training of models.

The automated intelligent data navigation and prediction tool generally comprises computer readable instructions for performing automated training of analytic algorithms, where the computer readable instructions are executable by a processor and stored on a memory. The automated intelligent data navigation and prediction tool can operate within a system that includes one or more computers, one or more user computing devices, and/or one or more databases that can communicate via a network (each of which is further described below). The automated intelligent data navigation and prediction tool is necessarily rooted in this system to perform proactive operations to overcome problems specifically arising in the realm of manual and automated selection algorithms (e.g., these problems include managing large amounts of available analytic algorithms and managing extensive sizes of a given data set, each of which subject data scientist to exponentially large possibilities, resulting in unwanted costs, expenses, and consumption of time). For example, because present manual and automated selection algorithms are non-optimal, the automated intelligent data navigation and prediction tool reduces and/or eliminates the time consuming process of sifting through analytic algorithms on an individual bases.

To perform the automated training of analytic algorithms, the automated intelligent data navigation and prediction tool (herein "automated tool") is configured as a machine-learning tool that sequentially allocates small subsets of training data amongst a large set of classifiers. The automated tool can select a classifier that will give near-optimal accuracy when trained on all data, while also minimizing a regret due to the cost of misallocated samples. Thus, the automated tool can accommodate very large datasets, as well as machine-learning toolkits with many competing classifiers and their various parameterizations.

In an example embodiment, the automated tool utilizes a data allocation strategy, referred herein as a data allocation using upper bounds (DAUB) algorithm, following the principle of optimism under uncertainty. That is, under mild assumptions of diminishing returns of allocating more training data, the DAUB algorithm achieves sub-linear regret in terms of misallocated data, which extends to sub-linear regret in terms of the training cost when the training cost functions are not too dissimilar. Further, the DAUB algorithm obtains, without further assumptions on accuracy functions, a bound on misallocated data that is asymptotically tight. In this way, a system (as described below with respect to FIG. 2) utilizing the DAUB algorithm can provide data scientists with live and dynamic monitoring and analysis of a wide range of analytic tools (e.g., the automated tool) and an ability to interact with this system, even when the given data sets are large and training the classifiers could take weeks on the full data set.

In an example operation, the automated tool receives subsets of size 500, 1000, and 1500 samples (i.e., equating to 3 separate subsets). The automated tool then utilizes the analytic algorithms to build models for each of these subsets. For example, if the automated tool utilized 100 algorithms to evaluate the three subsets, the automated tool would then build 300 models. Next, the automated tool evaluates a plurality of performance metrics for each model (on both the training set and a separate validation dataset). The automated tool then evaluates and analyzes a 'trend' for each model over the subsets. Note that with respect this trend, the automated tool can evaluate and analyze an accuracy trend over the three models of increasing size (not just a single subset of the data). Also, the automated tool can select the sizes of the initial three subsets so as to have enough data to find the trend, with the goal thereafter being to execute the most promising models on increasingly bigger subsets. The most promising analytic algorithm is then assigned an additional subset by the automated tool. The automated tool updates the trend and the ultimate full-dataset prediction based models built from the most recent subset. Thus, the automated tool extrapolates accuracy of models from recently allocated subsets out to an accuracy on the full data set. In turn, the automated tool yields an estimate of the accuracy for each model built by an algorithm for the full dataset. These models are then ranked by this estimated full dataset accuracy. This process may repeat until the ideal or best model is identified.

In view of the above, the automated training of analytic algorithms by the automated tool will be described with respect to the processing and modeling of raw data. Turning to FIG. 1, a data processing task flow 100 is shown as an example of processing and modeling of raw data according to an embodiment of the present invention. The raw data or primary data is information collected from a source that has not been subjected to processing or any other manipulation.

The data processing task flow 100 begins at block 110, where the raw data is ingested. Data ingestion includes obtaining, importing, and processing data for later use or storage in a database or repository (e.g., altering individual files by editing their content and/or formatting them to fit into a larger document). The data may include noisy data, i.e., any data that cannot be understood and interpreted correctly by machines, such as unstructured text. Then, the data processing task flow 100 continues to block 120, where any noisy data is cleaned to produce cleaned data. Data cleaning, also called data scrubbing, includes amending or removing data that is incorrect, incomplete, improperly formatted, or duplicated.

Next, at block 130, the clean data is transformed into a transformed feature or prepared data. For example, during transformation, a set of data values from a data format of a source data system is converted into the data format of a destination data system. Data transformation also includes feature generation, selection, and correlation.

With the raw data morphed into the prepared data, the data processing task flow 100 then proceeds to block 140, where the prepared data is modeled (e.g., model building) to generate predictions. Modeling can include performing regression and classification operation on the prepared data to generate these predictions. An example of a prediction is a classification prediction that attempts to predict a resulting class, such as A, B, or C. Another example of a prediction is a numerical prediction, or regression, that attempts to predict numerical values, such as an amount of money at a given future time.

Further, throughout the operation of the data processing task flow 100, a monitoring can be performed (as indicated by the dashed-block 150) to verify that any resulting predictions align with predefined preferences and end-users objectives. The automated tool can manage or participate in any or all stages of the data processing task flow 100. For example, the automated tool will now be described with respect to managing the modeling of block 140.

Figure 2:
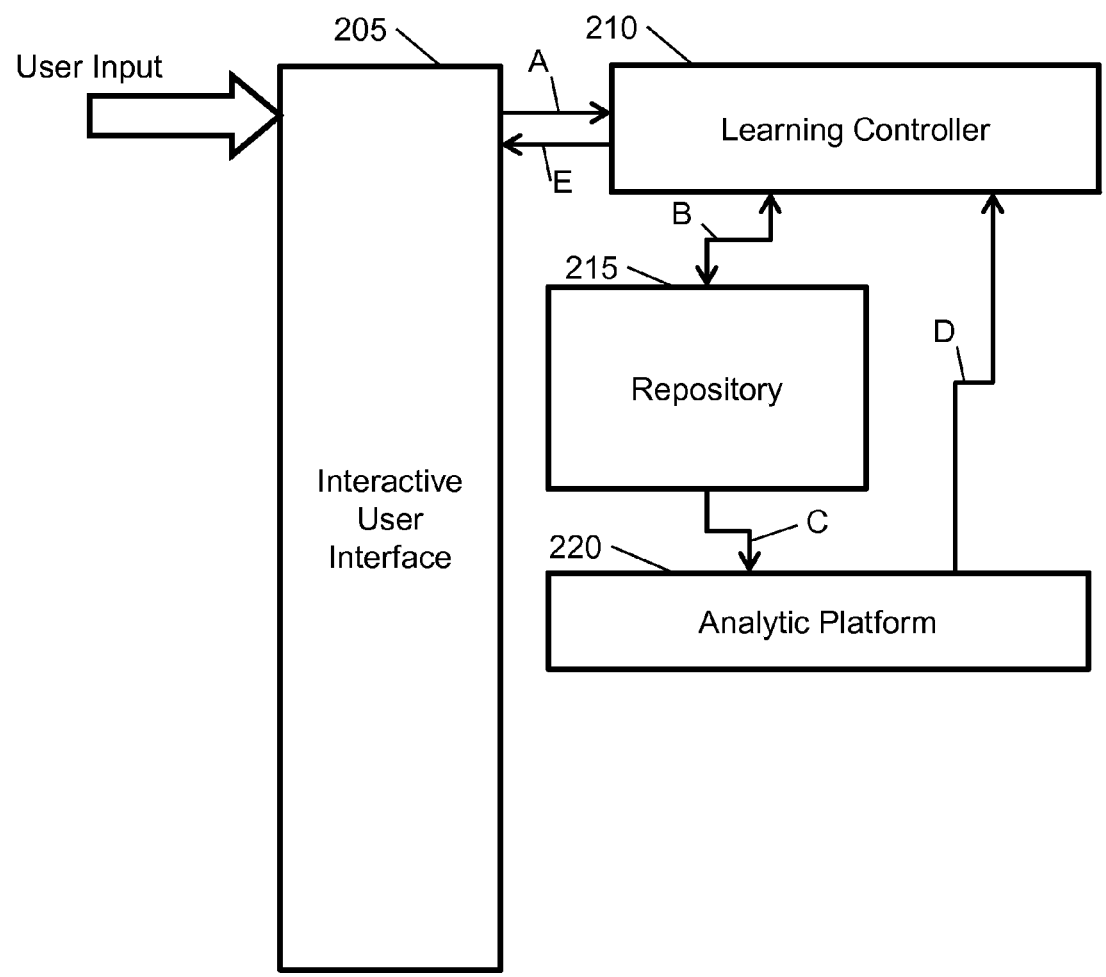
FIG. 2 depicts an automated intelligent data navigation system for automated training of models according to an embodiment of the present invention.

Turing now to FIG. 2, an automated intelligent data navigation system 200 (e.g., system 200) in which the automated tool operates is shown according to an embodiment of the present invention. The system 200 resides in a computing device via any combination of software and hardware to perform the operations described herein. The system 200 includes, via any combination of software and hardware, an interactive user interface 205, a learning controller 210, a repository 215, and an analytic platform 220.

The interactive user interface 205 is configured to provide user preferences, input datasets, visual summaries of analytic algorithm performance and supporting evidence integrated into a common implementation. For example, the interactive user interface 205 can be a smart graphic user interface for entering commands and configurations by a user and for outputting visualizations of the system 200. In this way, the interactive user interface 205 provides the medium through which a user can interact with the system 200. The user can interact with the learning controller 210, the repository 215, and/or the analytic platform 220.

The learning controller 210 configured to determine the right set of analytic algorithms, their combinations, and their configurations to use for the task. For instance, the learning controller 210 can store, manage, and operate the DAUB algorithm to perform automated training of models and thereby select a best or most suitable model for a given data set. The DAUB algorithm executes a data allocation strategy (as noted above). As shown, the DAUB algorithm starts by allocating every classifier b<<N (the full training dataset size) training examples. For i∈[M], the DAUB algorithm maintains the quantity $u_i = f_i(n_i) + (N - n_i) f'_i(n_i)$, where $n_i$ denotes the number of examples last allocated to classifier $C_i$ and all $f_i$ are estimated from the validation set $T_v$. This quantity $u_i$, under certain conditions analyzed later, provides an upper bound on $C_i$'s eventual validation accuracy, $f_i(N)$, if it were to be trained on all N instances of $T_r$. Further, assuming the training and validation sets are derived from the same distribution, the training accuracy with $n_i$ examples, i.e., $f_i(N)$ evaluated on the $n_i$ training examples themselves, provides a statistical upper bound on $f_i(N)$. The DAUB algorithm then takes the minimum of these two quantities as an estimated upper bound on $f_i(N)$ and chooses the classifier $C_i$ that has the most optimistic upper bound. $C_i$ is then allocated r times more training examples than what it was previously allocated, up to all N training examples, the DAUB algorithm then halts and outputs that trained classifier along with the data allocation sequence used during the process.

DAUB ALGORITHM:

Input: classifiers C = {$C_1$, . . . ,$C_M$},N training examples $T_r$,validation set $T_v$
Output: Data allocation sequence S,selection $\tilde{i} \in$ [M] with $C_{\tilde{i}}$ trained on all $T_r$.
Params : Geomtric ratio r > 1,granularity b $\in$ $N^+$
DAUB(C,$T_r$,$T_v$,r,b)
begin
| S ← empty sequence
| for i $\in$ 1..M do
|   | $n_i$ ← b
|   | append (i,$n_i$) to S
|   ⌊ $n_i$ ← UpdateBound (i)
| while $max_i$ $n_i$ < N do
|   | j ← arg $max_{i \in [M]u_i}$; break ties arbitrarily
|   | $n_j$ ← min{⌈$rn_j$⌉,N}
|   | append (j,$n_j$) to S
|   ⌊ $u_j$ ← UpdateBound (i)
| return S,$\tilde{i}C_{\tilde{i}}$,
end
UpdateBound (i $\in$ [M])
begin
| T ← $n_i$ examples sampled from $T_r$
| $f^T$ ← training accuracy of $C_i$ on T
| $f^V$ ← validation accuracy of $C_i$ on $T_v$
| $f'^V$ ← exstimated derivative of $f_i(n)$ at $n_i$
| $ub^T$ ← min{$f^T$,$ub^{r_i}$}
| return min{$f^V$,$ub^{r_i}$}
end The repository 215 is configured to store analytic algorithms annotated with metadata and plan execution of the stored analytic algorithms based a composition of the analytic platform 220. The analytic platform 220 is configured to execute the analytic algorithms according to the planned execution of the repository 215.

In an example operation, users can employ the interactive user interface 205 to submit (Arrow A) to the learning controller 210 a data set (e.g., user input), which specifies a nature of a problem (e.g., regression or classification) and other constraints (e.g., as model interpretability). The learning controller 210 utilizes (Arrow B) the repository 215 to identify a space of possible analytic algorithm flows (e.g., combinations of feature selection and model learning) given the data set and the constraints. The learning controller 210 then determines via the DAUB algorithm which of these flows to deploy and uses a planning and deployment engine of the repository 215 to construct and deploy (Arrow C) these analytics across the analytic platform 220. Data from the submitted dataset is then fed into these analytic algorithms, models are constructed, and evaluated to determine the performance of each flow. These results are fed back (Arrow D) to the learning controller 210, which then determines which of these flows to continue deploying or to replace by subsequent flows. Note that this process can be iterated until a desired end state is achieved, such as best model is selected.

Further, visual representations of the results are continuously communicated (Arrow E) via the interactive user interface 205 to the user.

These visual representations enable a user to understand the feature and model choices made by the system 200 and grant the user the ability to directly and dynamically interact with the process flow 100 of FIG. 1. For instance, evaluations performed in iterations of the DAUB Algorithm can be visualized in a dynamic dashboard (e.g., interactive user interface 205) that shows the ranking of the approaches based on their current performance estimates, along with other relevant information such as learning curves.

Figure 3:
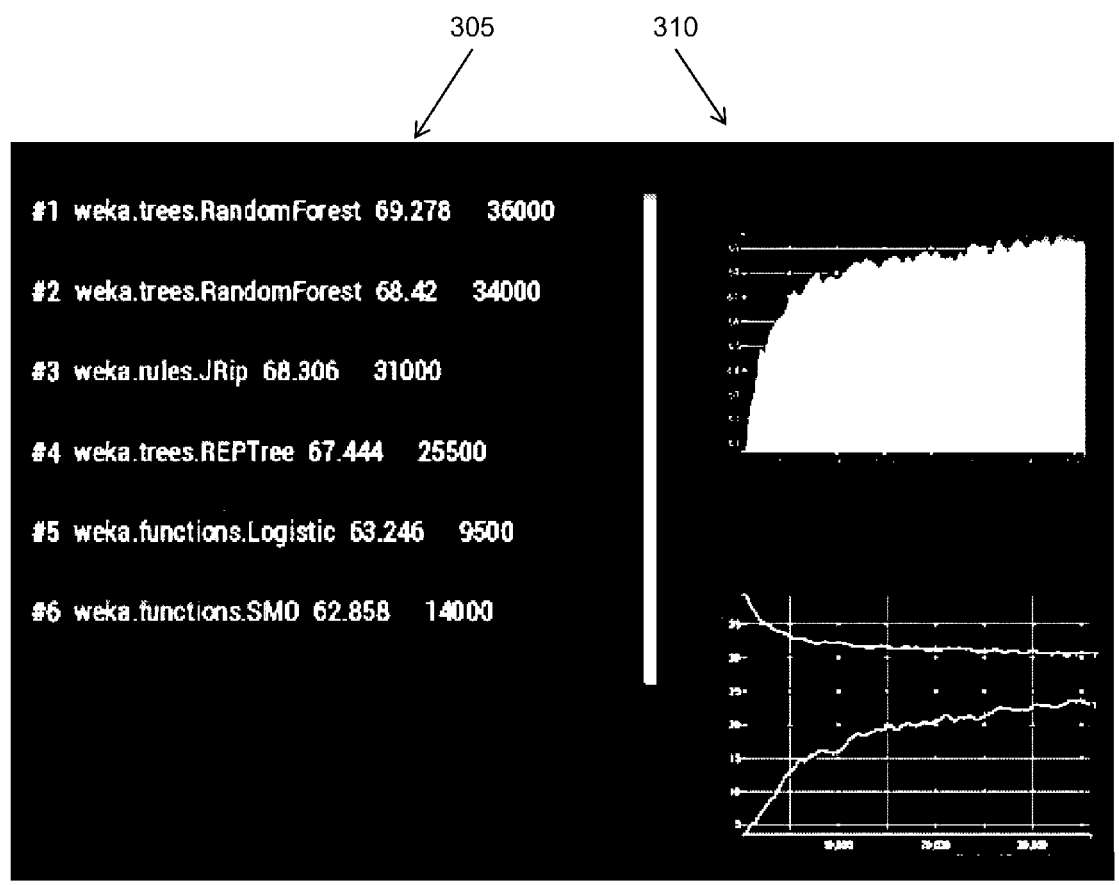
FIG. 3 further depicts an example interface of an automated intelligent data navigation tool according to an embodiment of the present invention.

Turning now to FIG. 3, an example interface 300 of an automated tool according to an embodiment of the present invention is depicted. The example interface 300 illustrates a dynamic implementation of the automated tool based on DAUB algorithm. On the left 305, a ranking of analytic approaches is shown. Each line displays a current rank based on an estimate from the DAUB algorithm, an analytics model name, a performance (e.g., prediction accuracy), and a number of training data points allocated to that analytics model. On the right 310 of the example interface, visualizations may be displayed with respect to the analytic approaches. For example, a top visualization illustrates an accuracy of selected approach versus a number training instances allocated; a bottom visualization shows a performance on training data versus validation data over training instances allocated.

Thus, a user can indicate through the interactive user interface 205 that they like a specific analytic platform and can test if the specific analytic platform's current performance can be further improved by the system 200 (e.g., by altering its parameters). In addition, the learning controller 210 can to leverage knowledge from the machine-learning community as a whole to make informed decision in deploying analytics.

Figure 4:
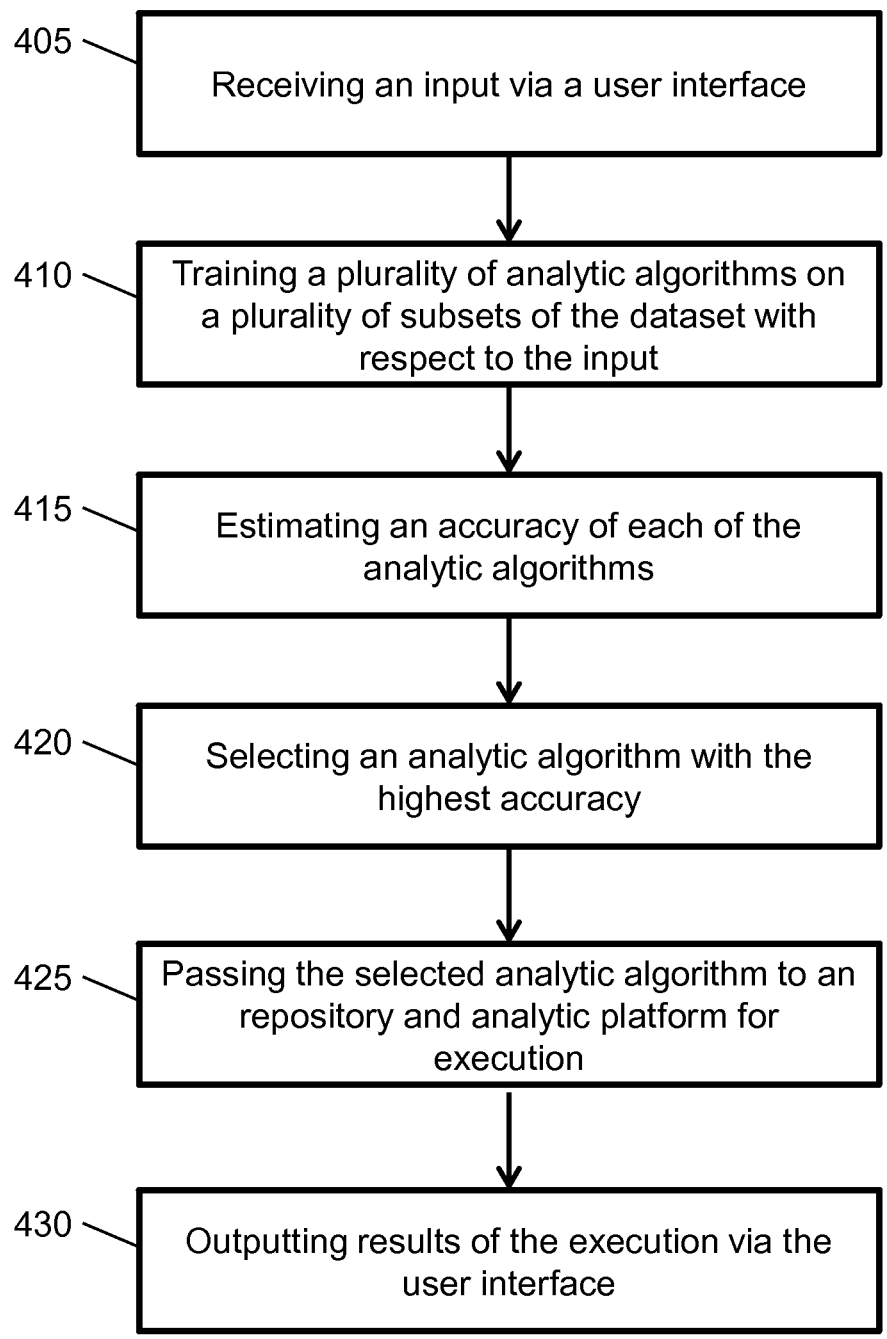
FIG. 4 depicts a process flow of an automated intelligent data navigation system according to an embodiment of the present invention.

FIG. 4 depicts another operation example of the system 200 via a process flow 400 according to an embodiment of the present invention. The process flow 400 will further be described with respect to FIGS. 5-7, which depict versions of a process flow 500 of an automated tool that searches for a best model according to an embodiment of the present invention.

The process flow 400 begins at block 405, where the system 200 receives an input, such as through the interactive user interface 204. The input can include any given data set (e.g., user input) that specifies a nature of a problem and constraints. Note that the system 200 can receive the input through other means, such as directly from databases (e.g., the repository 2015) that store raw, noisy, clean, and/or prepared data.

Next, at block 410, the system 200 training a plurality of analytic algorithms on a plurality of subsets with respect to the input. At block 415, the learning controller 210 estimates an accuracy of each analytic algorithm. Then, at block 420, the learning controller 210 selects an analytic algorithm with the highest accuracy. The operations of the process flow 400, with respect to blocks 410, 415, 420, will now be described in view of FIGS. 5-7.

Figure 5:
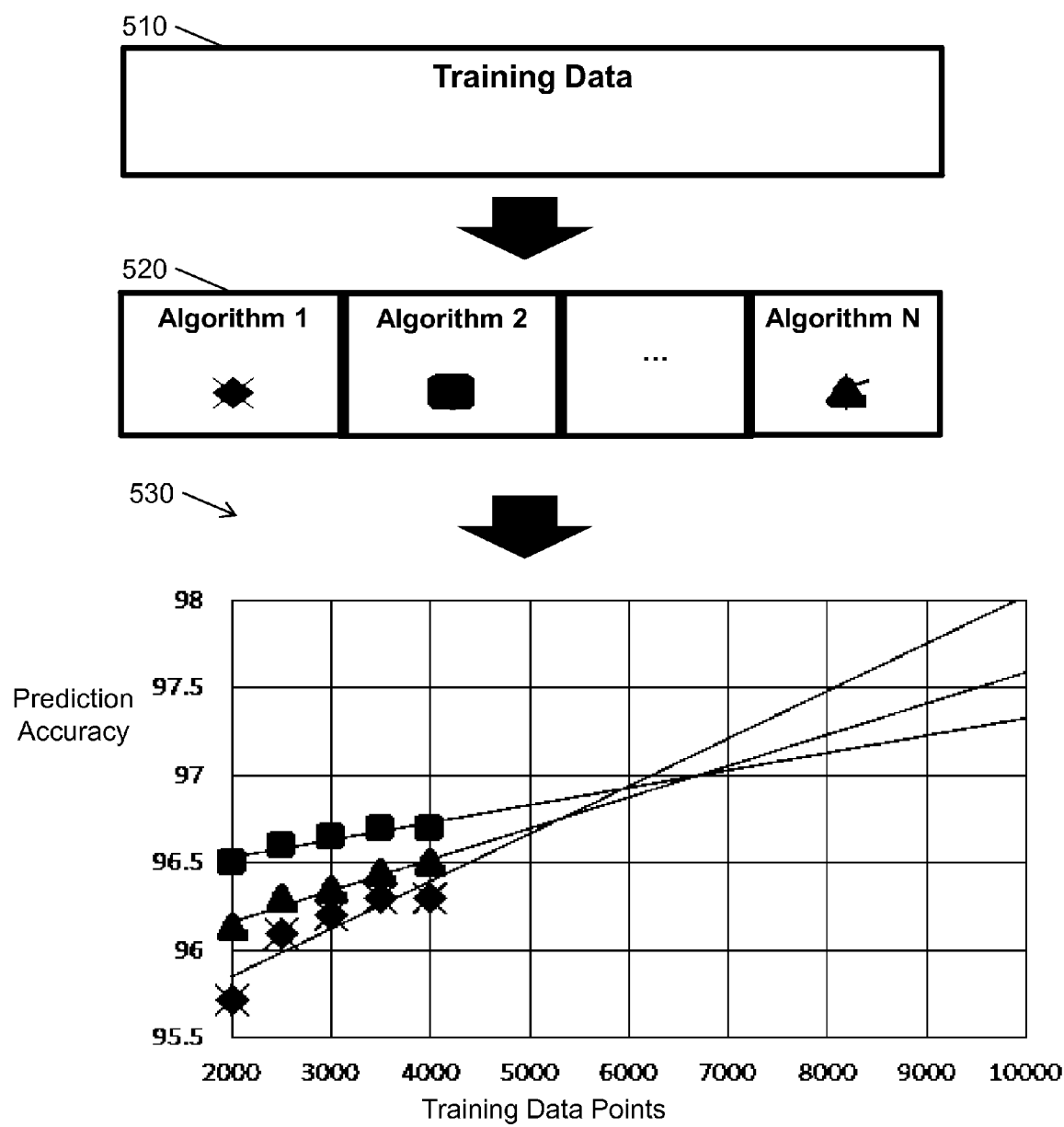
FIG. 5 depicts a process flow of an automated intelligent data navigation tool that searches for a best model according to an embodiment of the present invention.
Figure 6:
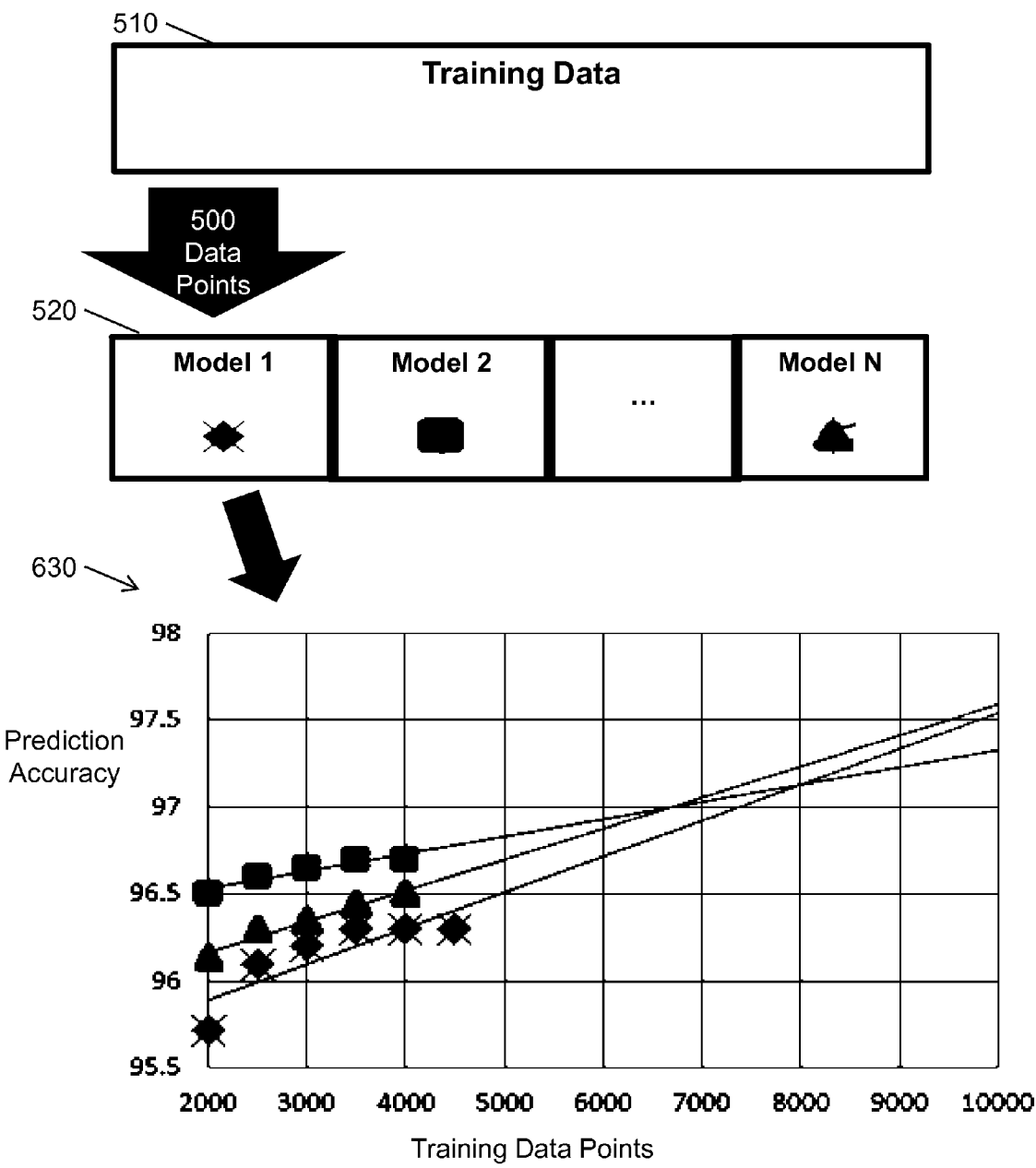
FIG. 6 further depicts the process flow of FIG. 5 according to an embodiment of the present invention.
Figure 7:
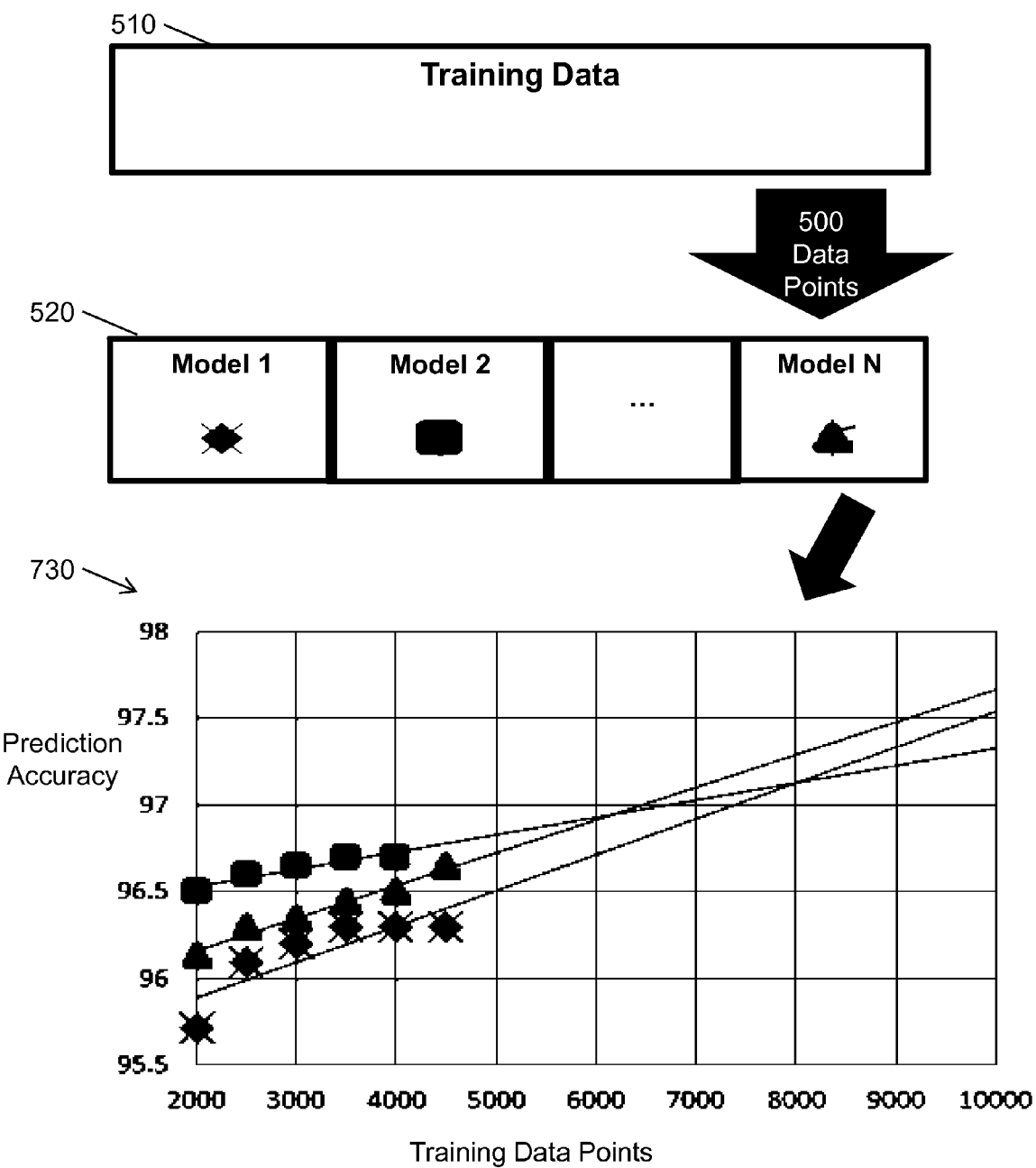
FIG. 7 further depicts the process flow of FIGS. 5 and 6 according to an embodiment of the present invention.

FIGS. 5-7 depicts a process flow 501 of an automated tool that searches for a best model according to an embodiment of the present invention. In general, the process flow 501 is an automated data analysis that utilizes optimism under uncertainty to hone in on a best model from a massive data pool of training data 510 within a time allotted to robustly project an accuracy at n samples to an expected accuracy at N samples. In the process flow 501, subsets of training data 510 are iteratively provided to a plurality of analytic algorithms 520 in accordance with the DAUB algorithm (e.g., based on first order Taylor expansion of unknown reward function $f(N)$, using a discrete derivative $f'(n, s)=(f(n)-f(n-s))/s$, where s a natural number) to provide intelligent allocation of training data. In this way, only allocated subsets of the training data 510 are used to identify the best classifier on entire training data 510.

For example, subsets of training data may be allocated to classifiers in increments of 500 samples, starting with 2000 samples and concluding at 4000 samples. Then, the automated tool calculating a normalized line across the samples allocated to each algorithm to determine a trend in the prediction accuracy (chart 530). Algorithm 2 of the plurality of analytic algorithms 520 has the lowest prediction accuracy as seen in chart 530, and hence does not receive further samples according to DAUB.

In the next two rounds, DAUB may allocate an additional 500 samples to Algorithm 1 and Algorithm N of the plurality of analytic algorithms 520, if according to DAUB they have a highest value of upper bound on accuracy. As seen in FIG. 6, 500 samples are allocated to Algorithm 1 and a normalized line across is estimated to determine a trend in the prediction accuracy (chart 630). As seen in FIG. 7, 500 samples are also allocated to Algorithm N and a normalized line across is estimated to determine a trend in the prediction accuracy (chart 730). Training of classifiers terminates upon reaching DAUB's termination criterion, and in this example, Algorithm N may then be selected as it maximizes upper bound on prediction accuracy.

Returning to FIG. 4, the process thus continues at block 425, where the selected analytic algorithm is passed through the system 200 (e.g., provided to the repository 215 and the analytic platform 220 for execution). Then, at block 430, results of the execution can be output, such as being displayed via the interactive user interface 205.

Embodiments of the present invention may be a system (e.g., implemented on a cloud computing environment), a method, and/or a computer program product, or a model thereof.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 8:
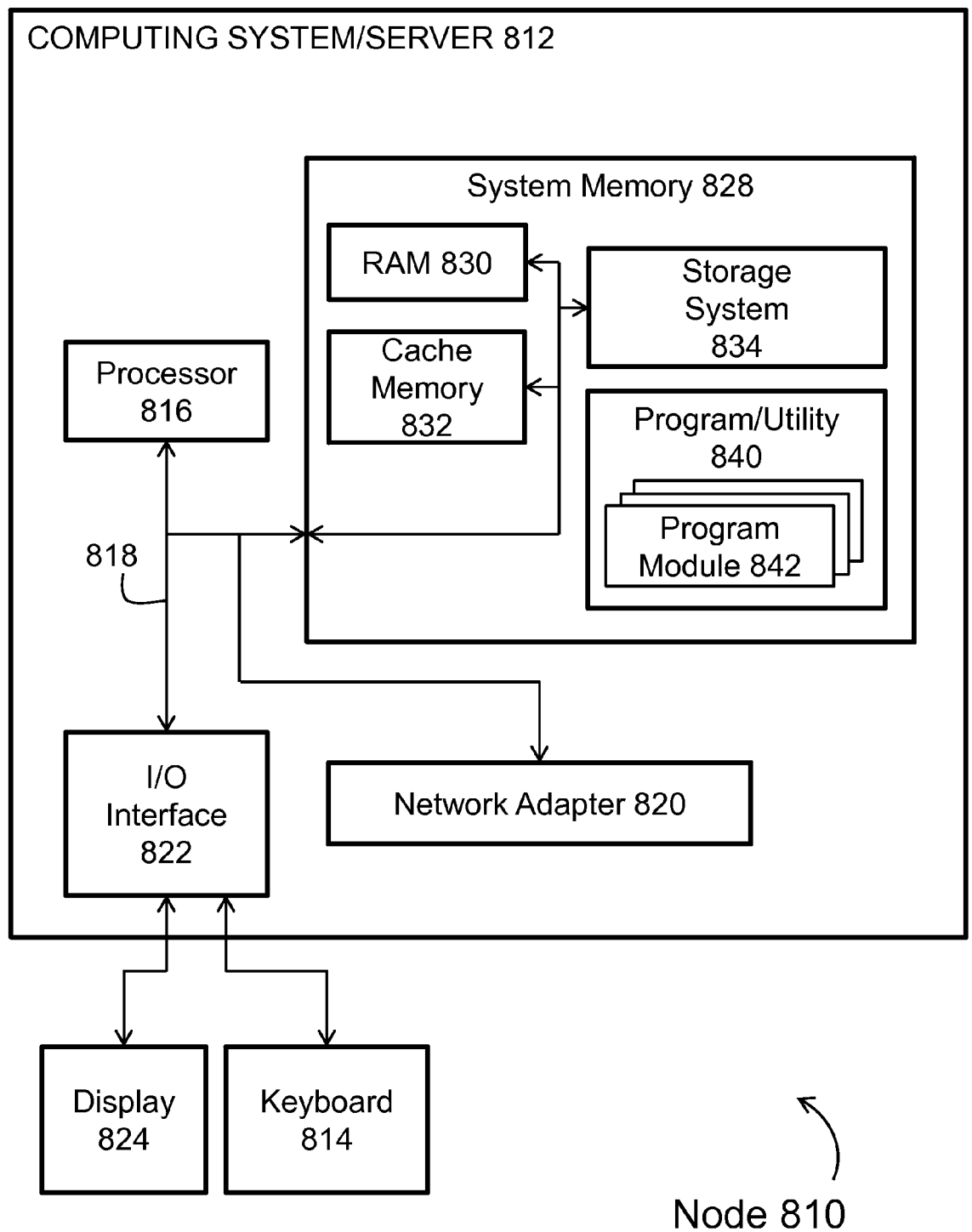
FIG. 8 depicts a cloud computing node according to an embodiment of the present invention.

Referring now to FIG. 8, a schematic of an example of a cloud computing node is shown. Cloud computing node 810 is only one example of a suitable cloud computing node and is not intended to suggest any limitation as to the scope of use or functionality of embodiments of the invention described herein. Regardless, cloud computing node 810 is capable of being implemented and/or performing any of the functionality set forth hereinabove.

In cloud computing node 810 there is a computer system/server 812, which is operational with numerous other general purpose or special purpose computing system environments or configurations. Examples of well-known computing systems, environments, and/or configurations that may be suitable for use with computer system/server 812 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 812 may be described in the general context of computer system executable instructions, such as program modules, being executed by a computer system. Generally, program modules may include routines, programs, objects, components, logic, data structures, and so on that perform particular tasks or implement particular abstract data types. Computer system/server 812 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 8, computer system/server 812 in cloud computing node 810 is shown in the form of a general-purpose computing device. The components of computer system/server 812 may include, but are not limited to, one or more processors or processing units 816, a system memory 828, and a bus 818 that couples various system components including system memory 828 to processor 816.

Bus 818 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 812 typically includes a variety of computer system readable media. Such media may be any available media that is accessible by computer system/server 812, and it includes both volatile and non-volatile media, removable and non-removable media.

System memory 828 can include computer system readable media in the form of volatile memory, such as random access memory (RAM) 830 and/or cache memory 832. Computer system/server 812 may further include other removable/non-removable, volatile/non-volatile computer system storage media. By way of example only, storage system 834 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 818 by one or more data media interfaces. As will be further depicted and described below, memory 828 may include at least one program product having a set (e.g., at least one) of program modules that are configured to carry out the functions of embodiments of the invention.

Program/utility 840, having a set (at least one) of program modules 842, may be stored in memory 828 by way of example, and not limitation, as well as an operating system, one or more application programs, other program modules, and program data. Each of the operating system, one or more application programs, other program modules, and program data or some combination thereof, may include an implementation of a networking environment. Program modules 842 generally carry out the functions and/or methodologies of embodiments of the invention as described herein.

Computer system/server 812 may also communicate with one or more external devices 814 such as a keyboard, a pointing device, a display 824, etc.; one or more devices that enable a user to interact with computer system/server 812; and/or any devices (e.g., network card, modem, etc.) that enable computer system/server 812 to communicate with one or more other computing devices. Such communication can occur via Input/Output (I/O) interfaces 822. Still yet, computer system/server 812 can communicate with one or more networks such as a local area network (LAN), a general wide area network (WAN), and/or a public network (e.g., the Internet) via network adapter 820. As depicted, network adapter 820 communicates with the other components of computer system/server 812 via bus 818. It should be understood that although not shown, other hardware and/or software components could be used in conjunction with computer system/server 812. Examples, include, but are not limited to: microcode, device drivers, redundant processing units, external disk drive arrays, RAID systems, tape drives, and data archival storage systems, etc.

Figure 9:
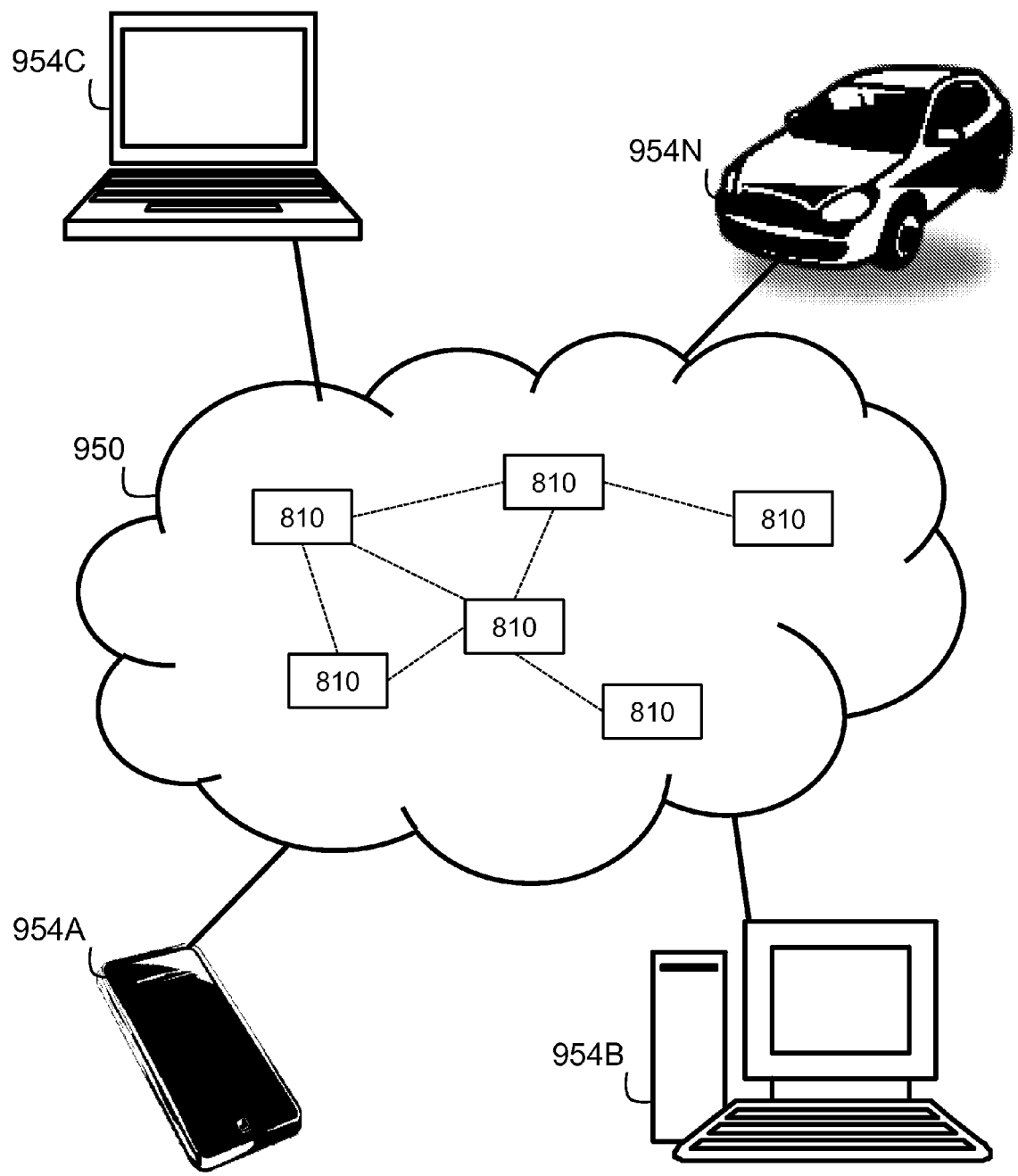
FIG. 9 depicts a cloud computing environment according to an embodiment of the present invention.

Referring now to FIG. 9, illustrative cloud computing environment 950 is depicted. As shown, cloud computing environment 950 comprises one or more cloud computing nodes 810 with which local computing devices used by cloud consumers, such as, for example, personal digital assistant (PDA) or cellular telephone 954A, desktop computer 954B, laptop computer 954C, and/or automobile computer system 954N may communicate. Nodes 810 may communicate with one another. They may be grouped (not shown) physically or virtually, in one or more networks, such as Private, Community, Public, or Hybrid clouds as described hereinabove, or a combination thereof. This allows cloud computing environment 950 to offer infrastructure, platforms and/or software as services for which a cloud consumer does not need to maintain resources on a local computing device. It is understood that the types of computing devices 954A-N shown in FIG. 9 are intended to be illustrative only and that computing nodes 810 and cloud computing environment 950 can communicate with any type of computerized device over any type of network and/or network addressable connection (e.g., using a web browser).

Figure 10:
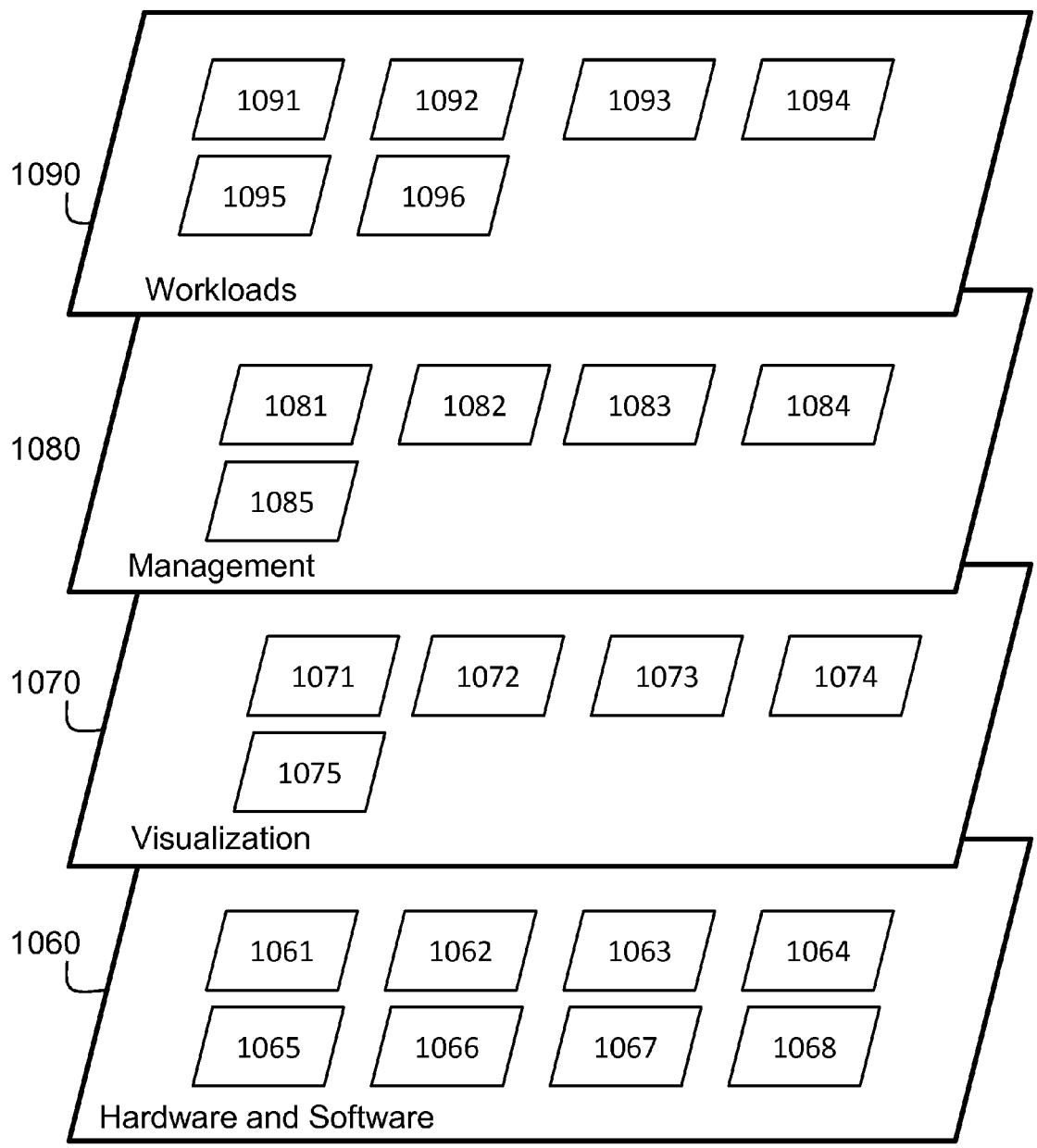
FIG. 10 depicts abstraction model layers according to an embodiment of the present invention.

Referring now to FIG. 10, a set of functional abstraction layers provided by cloud computing environment 950 (FIG. 9) is shown. It should be understood in advance that the components, layers, and functions shown in FIG. 10 are intended to be illustrative only and embodiments of the invention are not limited thereto. As depicted, the following layers and corresponding functions are provided:

Hardware and software layer 1060 includes hardware and software components. Examples of hardware components include: mainframes 1061; RISC (Reduced Instruction Set Computer) architecture based servers 1062; servers 1063; blade servers 1064; storage devices 1065; and networks and networking components 1066. In some embodiments, software components include network application server software 1067 and database software 1068.

Virtualization layer 1070 provides an abstraction layer from which the following examples of virtual entities may be provided: virtual servers 1071; virtual storage 1072; virtual networks 1073, including virtual private networks; virtual applications and operating systems 1074; and virtual clients 1075.

In one example, management layer 1080 may provide the functions described below. Resource provisioning 1081 provides dynamic procurement of computing resources and other resources that are utilized to perform tasks within the cloud computing environment. Metering and Pricing 1082 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 1083 provides access to the cloud computing environment for consumers and system administrators. Service level management 1084 provides cloud computing resource allocation and management such that required service levels are met. Service Level Agreement (SLA) planning and fulfillment 1085 provide pre-arrangement for, and procurement of, cloud computing resources for which a future requirement is anticipated in accordance with an SLA.

Workloads layer 1090 provides examples of functionality for which the cloud computing environment may be utilized. Examples of workloads and functions which may be provided from this layer include: mapping and navigation 1091; software development and lifecycle management 1092; virtual classroom education delivery 1093; data analytics processing 1094; transaction processing 1095; and application workload optimization 1096.

Technical effects and benefits of embodiments of the present invention include providing systematic exploration of available analytic algorithms in a timely manner; providing user-interaction and user assistance through a succinct interface; utilizing cross-platform (as well as user-defined) analytic algorithms; providing automated hyper-parameter tuning in a timely manner; representing, learning, and applying data science patterns (e.g. including domain/industry dependent); operating across multiple stages of processing pipeline; and providing self-learning and diagnostic capabilities. In this way, the embodiments of the present invention address the technical problems associated with manual analytic algorithms selection and automated selection algorithms, which select a most suitable analytic algorithms for a given problem instance based on knowledge gathered solely on other instances and features characterizing the instance itself.

For example, embodiments of the present invention differ from these manual analytic algorithms selection and automated selection algorithms in that embodiments of the present invention do not assume that training (and evaluation) on a small fixed fraction of the N examples reliably ranks the analytic algorithms if they were to be trained on all N examples. Instead, embodiments of the present invention can dynamically determine how much data to allocate to each analytic algorithm, informed by a performance of that analytic algorithm thus far.

Further, embodiments of the present invention differ from these manual analytic algorithms selection and automated selection algorithms in that embodiments of the present invention perform meta-Learning based on direct observations on data to minimize the amount of training data to be considered to make an informed selection. That is, while present meta-Learning may perform selection task by generalizing over past data and online methods operate at the meta-learning level, embodiments of the present invention when given a data set select best approach by directly considering parts of the actual data by allocating only a subset of the examples to identify best classifier on entire training data.

In view of the above, embodiments of the present invention can bring automation into key areas of large-scale data analysis tasks and overcome "analytic decision overload" for data scientists. Further, embodiments of the present invention can enable data scientist to view and interact with decision making process in an online fashion and obtain rapid insights from data to answer key questions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for automatically selecting from a plurality of analytic algorithms a best performing analytic algorithm to apply to a dataset, comprising:

executing, by a processor coupled to a memory, a data allocation using estimates of upper bounds on accuracies to perform:

training, by the processor, a plurality of analytic algorithms on a plurality of subsets of the dataset, and estimating, by the processor, a corresponding prediction accuracy trend across the subsets for each of the plurality of analytic algorithms to produce a plurality of accuracy trends, each corresponding prediction accuracy trend across the subsets is a normalized line calculated across the subsets of each of the plurality of analytic algorithms;

selecting, by the processor, the best performing analytic algorithm from the plurality of analytic algorithms based on the corresponding prediction accuracy trend with a highest value from the plurality of accuracy trends; and outputting, by the processor, the best performing analytic algorithm via an interactive user interface through which a user can interact with the system.

2. The method of claim 1, wherein the training of the plurality of analytic algorithms is responsive to an input comprising the dataset, the plurality of analytic algorithms, and a validation set.

3. The method of claim 1, wherein the dataset is prepared data derived from raw data through ingestion, cleansing, and transformation operations.

4. The method of claim 1, wherein the training of the plurality of analytic algorithms, comprises:

allocating each of the plurality of analytic algorithms to the dataset.

5. The method of claim 1, wherein the outputting of the best performing analytic algorithm, comprises:

displaying a smart graphic user interface presenting a visualization of the best performing analytic algorithm.

\* \* \* \* \*